United States Patent
Paul et al.

(10) Patent No.: US 12,360,211 B2
(45) Date of Patent: Jul. 15, 2025

(54) SIGNAL DELAY DEVICE AND SIMULATOR DEVICE FOR SIMULATING SPATIAL DISTANCES IN DISTANCE MEASURING DEVICES BASED ON ELECTROMAGNETIC WAVES

(71) Applicant: dSPACE GmbH, Paderborn (DE)

(72) Inventors: Jeffrey Paul, Torrance, CA (US); Jonathan Watkins, Lakewood, CO (US)

( * ) Notice: Subject to any disclaimer, the term of this patent is extended or adjusted under 35 U.S.C. 154(b) by 659 days.

(21) Appl. No.: 17/418,957

(22) PCT Filed: Dec. 28, 2019

(86) PCT No.: PCT/EP2019/087126
§ 371 (c)(1),
(2) Date: Jun. 28, 2021

(87) PCT Pub. No.: WO2020/136279
PCT Pub. Date: Jul. 2, 2020

(65) Prior Publication Data
US 2022/0120856 A1 Apr. 21, 2022

Related U.S. Application Data

(60) Provisional application No. 62/786,070, filed on Dec. 28, 2018.

(51) Int. Cl.
*G01S 7/40* (2006.01)
*G01S 7/497* (2006.01)

(52) U.S. Cl.
CPC .......... *G01S 7/4065* (2021.05); *G01S 7/4086* (2021.05); *G01S 7/497* (2013.01)

(58) Field of Classification Search
CPC ........... G01S 7/40; G01S 7/4065; G04G 9/02; G04G 9/06; G04G 9/08; G04G 9/10; G04G 9/12; G01D 5/3538; G01D 5/3539
See application file for complete search history.

(56) References Cited

U.S. PATENT DOCUMENTS 4,450,447 A * 5/1984 Zebker ................. G01S 7/4052
342/25 R
4,613,863 A * 9/1986 Mitchell .................. G01S 7/38
342/14

(Continued)

FOREIGN PATENT DOCUMENTS

CN 102778673 A 11/2012
DE 3888993 T2 10/1994

(Continued)

OTHER PUBLICATIONS

International Search Report and Written Opinion of the International Searching Authority; Application No. PCT/EP2019/087126; Completed: Mar. 30, 2020; Mailing Date: Apr. 8, 2020; 18 Pages.

*Primary Examiner* — Vladimir Magloire
*Assistant Examiner* — Eric K Hodac
(74) *Attorney, Agent, or Firm* — Patrick D. Duplessis

(57) ABSTRACT

A signal delay device includes a demultiplexer, D∈N delay means, D additional delay means, a multiplexer, and a control unit. For each delay means, a delay input and a demultiplexer output are connected, and a delay output and a multiplexer input are connected. For each additional delay means, an additional delay input is connected to a delay signal path, and an additional delay output and a multiplexer input are connected. The demultiplexer divides an input data word stream into parallel data word streams. Each delay means will delay the data words in the parallel data word streams. Each additional delay means will delay the data words in the delayed parallel data word stream by an additional delay time. The control unit controls the multiplexer such that an output data word stream corresponding to the input data word stream with a time delay is output.

18 Claims, 7 Drawing Sheets

(56) References Cited

U.S. PATENT DOCUMENTS

| | | | | |
|---|---|---|---|---|
| 4,617,658 A | * | 10/1986 | Walters | H04J 3/1629 |
| | | | | 370/538 |
| 5,140,688 A | * | 8/1992 | White | G06F 1/10 |
| | | | | 365/194 |
| 7,365,313 B2 | * | 4/2008 | Fuhrer | H01J 49/0036 |
| | | | | 250/281 |
| 11,415,668 B2 | * | 8/2022 | Gruber | G01S 7/4052 |
| 2004/0012517 A1 | | 1/2004 | Abou-Jaoude et al. | |

FOREIGN PATENT DOCUMENTS

| | | |
|---|---|---|
| DE | 102017217800 A1 | 7/2018 |
| EP | 3115804 A1 | 1/2017 |

\* cited by examiner

SIGNAL DELAY DEVICE AND SIMULATOR DEVICE FOR SIMULATING SPATIAL DISTANCES IN DISTANCE MEASURING DEVICES BASED ON ELECTROMAGNETIC WAVES

TECHNICAL FIELD

The invention relates to a signal delay device, on the one hand, and to a simulator device, on the other hand, for simulating spatial distances in distance measuring devices using electromagnetic waves.

BACKGROUND

A distance measuring device is based on electromagnetic waves if, for the determination of a spatial object distance between the distance measuring device and an object, it radiates a measurement signal in the form of electromagnetic waves, receives a reflection of the radiated measurement signal at the object as an echo signal, and determines the object distance using properties of the radiated measurement signal and the received echo signal. Such a property is, for example, an overall transit time of the signal, i.e. a transit time of the measurement signal from the distance measuring device to the object together with a transit time of the echo signal from the object to the distance measuring device. The object distance is determined by the distance measuring device using an evaluation unit. Often a distance measuring device is not only designed to determine the object distance between the distance measuring device and an object, but also, for example, a size of the object and a relative velocity between the distance measuring device and the object using such signals. The relative velocity is usually determined by evaluating the Doppler effect in such signals.

Distance measuring devices based on electromagnetic waves are, for example, radar and lidar distance measuring devices. Radar distance measuring devices are based on electromagnetic waves in the radio frequency range and lidar distance measuring devices rare based on those in the laser frequency range.

Distance measuring devices are frequently used in motor vehicles. Objects include the environment and, in particular, other road users. A common frequency range of the electromagnetic waves of radar distance measuring devices in motor vehicles is around a frequency of 77 GHz.

Distance measuring devices and, in particular, their evaluation units are, of course, also tested during development. One aim of testing is to ensure that the object distances determined by a distance measuring device are identical to the actual object distances. Testing can take place in the real environment or in a simulated environment. Testing in the real environment must, of course, be carried out with real objects. It is time-consuming, expensive and the reproducibility of measurements is often impaired by disturbances from the environment. Testing in a simulated environment takes place in a simulator, wherein the objects must, of course, also be simulated. Compared to testing in the real environment, testing in the simulated environment is time-saving, cheaper and more reproducible.

The simulator also includes a simulator device for simulating spatial distances. The simulator consists of a receiver, an analog-to-digital converter, a signal delay device, a digital-to-analog converter, and a transmitter. The receiver is designed to receive measurement signals radiated by a distance measuring device in the form of first electromagnetic waves, mix them downwardly and feed them to the analog-to-digital converter. The analog-to-digital converter is adapted to convert the measurement signals mixed downwardly into a data word stream and to feed it to the signal delay device. The signal delay device is designed to delay the data word stream and to feed the delayed data word stream to the digital-to-analog converter. By designing the signal delay device to delay the data word stream, it is designed to simulate spatial distances. The digital-to-analog converter is designed to convert the delayed data word stream into echo signals and to feed them to the transmitter. The transmitter is designed to mix the echo signals upwardly and radiate them back to the distance measuring device in the form of second electromagnetic waves. Downward mixing and upward mixing are usually complementary to one another. Usually, downward mixing is performed by a downward mixer and upward mixing by an upward mixer.

Thus, the simulator device generates an echo signal with a delay from a received measurement signal which has been radiated by a distance measuring device and radiates it back to the distance measuring device. The echo signal is received by the distance measuring device and, when the measurement signal and echo signal are evaluated by the evaluation device of the distance measuring device, the delay added by the signal delay device of the simulator device increases the overall transit time. A simulator having such a simulator device is referred to as an OTA device, where OTA stands for over the air, and indicates that real electromagnetic waves are supplied to a distance measuring device as echo signals and not, for example, simulated echo signals to the evaluation unit of the distance measuring device.

The delay $\Delta t$ generated by the signal delay device, wherein a time delay is always meant, appears as a transit time to the distance measuring device, which is why a distance $\Delta d$ between the distance measuring device and a simulated object can be set by setting the delay. Since the overall transit time is not only given by the delay $\Delta t$, the distance $\Delta d$, due to the delay $\Delta t$, is generally different from the object distance. Since electromagnetic waves propagate at the speed of light $c \approx 3 \cdot 10^8$, the distance is half the product of the speed of light and the delay, i.e. $\Delta d = 0.5 \, c \, \Delta t$. The simulator device and, in particular, the delay device are real-time devices, wherein the specifications result from the propagation speed of electromagnetic waves.

When testing a distance measuring device in a simulator, the distance should be arbitrarily pre-settable by the delay. For this, the signal delay device must be capable of generating arbitrary delays. Digital signal delay devices having digital delay lines are known from the prior art. The invention relates only to digital signal delay devices and not to analog signal delay devices. Digital delay lines, for example, are implemented with different types of ICs. One type of IC, for example, is the FPGA. The FPGA is particularly suitable because it can be used to implement not only digital delay lines, but also other elements of the signal delay device and often also of the simulator device. In addition, FPGAs are inexpensive and reconfigurable compared to other types of ICs. A disadvantage of FPGAs, however, is a lower work cycle $f_A$ compared to other types of ICs. If, for example, a delay line is implemented in an FPGA which delays the data word stream by one work cycle of the FPGA and the FPGA has a work cycle of $f_A = 625$ MHz, then the distance resolution $\Delta d = 0.5 \cdot c \cdot (1/f_A) = 24$ cm. This means that the minimum distance generated by the signal delay device between the distance measuring device and a simulated object is 24 cm and can be a multiple of 24 cm. This distance is an additional distance.

SUMMARY

The object of the present invention is to specify a signal delay device and a simulator device having such a signal delay device, for which the disadvantages shown in the prior art are at least reduced, including in particular an increase in the distance resolution.

In a first alternative, the object is achieved by a signal delay device according to the present disclosure.

This signal delay device according to the invention for the simulation of spatial distances in distance measuring devices based on electromagnetic waves has a demultiplexer, $D \in \mathbb{N}$ delay means, D additional delay means, a multiplexer and a control unit. D is, thus, an integer greater than or equal to 1.

The demultiplexer has a demultiplexer input and D demultiplexer outputs. Each of the D delay means has a delay input and a delay output. Each of the D additional delay means has an additional delay input and an additional delay output. The multiplexer has 2·D multiplexer inputs and a multiplexer output. The number of multiplexer inputs is therefore twice as high as the number of demultiplexer outputs.

For each of the D delay means, the delay input and one of the D demultiplexer outputs are connected to one another via an input signal path and the delay output and one of the 2·D multiplexer inputs are connected to one another via a delay signal path. For each of the D additional delay means, the additional delay input is connected to one of the delay signal paths and the additional delay output and one of the 2·D multiplexer inputs are connected to one another via an additional delay signal path. The individual input signal paths are separate from one another, i.e. not connected to one another. The same applies to the individual delay signal paths and also to the additional delay signal paths.

The demultiplexer is designed to separate an input data word stream containing data words with an external transmission rate of S at the demultiplexer input into D interleaved, parallel data word streams at an internal transmission rate of P=S/D and to output these at the D demultiplexer outputs. A data word stream such as the input data word stream or each of the parallel data word streams has serially consecutive data words. The chronological sequence of the data words is therefore sequential. A data word generally has one or more bits as information carriers. For example, a data word has 10 bits. While the transmission of the data words takes place sequentially in time, the transmission of the bits of a data word usually takes place simultaneously, i.e. in parallel. Signal paths such as the input signal path, the delay signal path and the additional delay signal path are designed accordingly for the transmission of data words.

Each of the D delay means can be preset with a forwarding delay factor $m \in \mathbb{N}_0$ and each of the D delay means is designed to delay each data word in the respective parallel data word stream at the delay input by a forwarding delay time $\Delta t_m = m/P$ and to output the delayed data word at the delay output. Accordingly, a delay means delays all data words in a data word stream present at the delay input so that a data word stream is present at the delay output of the delay means which is delayed by the forwarding delay time $\Delta t_m$ with respect to the data word stream at the delay input, but is otherwise identical to it. The forwarding delay time is identical for all D delay means. m is an integer greater than or equal to 0.

Each of the D additional delay means is designed to delay each data word in the respective delayed parallel data word stream at the additional delay input by an additional delay time of $\Delta t_z = 1/P$ and to output the additionally delayed data word at the additional delay output. An additional delay means therefore delays all data words in a data word stream present at the additional delay input, so that a data word stream is present at the additional delay output of the additional delay means which is delayed by the additional delay time $\Delta t_z$ with respect to the data word stream at the additional delay input, but is otherwise identical to it.

An output delay factor $n \in \mathbb{N}_0$ can be preset to the control unit. Furthermore, it is designed to determine the forwarding delay factor m from a predefined output delay factor n and to preset this to the D delay means. In addition, it is designed to control the multiplexer in such a manner that an output data word stream corresponding to the input data word stream with a time delay of $\Delta t_D = n/S$ is output at the multiplexer output, n being an integer greater than or equal to 0. Accordingly, the control unit is designed to control the multiplexer in such a manner that the output data word stream is composed of the data words in the delayed data word streams present at the 2·D multiplex inputs.

The signal delay device according to the invention has the advantage that, while maintaining a work cycle $f_A$ of an IC in which the delay means and additional delay means are implemented, the distance resolution is increased by the factor D in comparison with signal delay devices known from the prior art. Only the demultiplexer and the multiplexer must be designed for the external transmission rate. Preferably, at least one of the delay means and/or one of the additional delay means is implemented in an FPGA. The implementation of the signal delay device in an FPGA is particularly advantageous, as it is cost-effective and reconfigurable in comparison to other ICs. Preferably, this implementation also includes the demultiplexer and multiplexer.

For the number D=2 and an external transmission rate of S=1 GS/s, the following results: The signal delay device has two delay means and two additional delay means. The demultiplexer has two demultiplexer outputs and the multiplexer four multiplexer inputs. The external transmission rate of S=1 GS/s means that a data word stream with a number of 1 billion data words per second is transmitted. The internal transmission rate is P=S/D=(1GS/s)/2=500 MS/s. There are a total of two parallel data word streams. The internal transfer rate, for example, is implemented with an FPGA that has a work cycle of $f_A$=500 MHz, so that the internal transfer rate of P=500 GS/s is implemented.

In one design of the first alternative of the signal delay device according to the invention, it is provided that the control unit is designed to determine the forwarding delay factor according to $m = \lfloor n/D \rfloor$. Thus, m is the largest integer less than or equal to n/D.

In a further design of the signal delay device, it is provided that at least one of the D additional delay means has a work cycle of $f_P = S/D$. Preferably, the work cycle $f_P$ corresponds to the work cycle $f_A$ of the IC.

In a further design of the first alternative, it is provided that at least one of the additional delay means is a delay line.

In a further design of the first alternative, it is provided that at least one of the additional delay means is a flip-flop, preferably a D-flip-flop.

The object is achieved in a second alternative by a signal delay device according to the present disclosure.

This signal delay device according to the invention for the simulation of spatial distances in distance measuring devices based on electromagnetic waves has a demultiplexer, $D \in \mathbb{N}$ delay means, a multiplexer and a control unit.

The demultiplexer has a demultiplexer input and D demultiplexer outputs. Each of the D delay means has a delay input and a delay output. The multiplexer has D multiplexer inputs and a multiplexer output. The number of multiplexer inputs is therefore equal to the number of demultiplexer outputs.

For each of the D delay means, the delay input and one of the D demultiplexer outputs are connected to one another via an input signal path and the delay output and one of the D multiplexer inputs are connected to one another via a delay signal path. The individual input signal paths are separate from one another, i.e. not connected to one another. The same applies to the individual delay signal paths.

The demultiplexer is designed to separate an input data word stream having data words with an external transmission rate of S at the demultiplexer input into D interleaved, parallel data word streams at an internal transmission rate of P=S/D and to output these at the D demultiplexer outputs.

Each of the D delay means can be preset with a separate forwarding delay factor $m_d \in \mathbb{N}_0$ with $d \in \mathbb{N} \leq D$ and each of the D delay means is designed to delay each data word in the respective parallel data word stream at the delay input by a separate forwarding delay time $\Delta t_{m,d} = m_d/P$ and to output the delayed data word at the delay output. The forwarding delay time can thus be different between the D delay means.

An output delay factor $n \in \mathbb{N}_0$ can be preset to the control unit. Furthermore, it is designed to determine the separate forwarding delay factors $m_d$ from a predefined output delay factor n and to preset them to the D presettable delay means. In addition, it is designed to control the multiplexer in such a manner that an output data word stream corresponding to the input data word stream with a time delay of $\Delta t_D = n/S$ is output at the multiplexer output. Accordingly, the control unit is designed to control the multiplexer in such a manner that the output data word stream is composed of the data words in the delayed data word streams present at the D multiplexer inputs.

This signal delay device according to the invention also has the advantage that the distance resolution is increased by the factor D in comparison to signal delay devices known from the prior art if a work cycle $f_A$ of an IC in which the delay devices are implemented is maintained. Only the demultiplexer and the multiplexer must be designed for the external transmission rate. Preferably, at least one of the delay devices is implemented in an FPGA. The implementation of the signal delay device in an FPGA is particularly advantageous, as it is cost-effective and reconfigurable in comparison to other ICs. Preferably, this implementation also includes the demultiplexer and multiplexer.

In contrast to the first alternative, the second alternative has no additional delay means and instead separate forwarding delay factors can be preset for the delay means. The advantages of the second alternative compared to the first include the lack of additional delay means and the reduction of multiplexer inputs to half. One of the disadvantages of the second alternative compared to the first alternative is the design of the delay means and the control unit so that separate forwarding delay factors are able to be preset for each of the delay means. In other respects, the explanations for the first alternative apply accordingly to the second and vice versa.

However, both alternative signal delay devices are based on the same idea. This means that if a work cycle $f_A$ of an IC is maintained, in which the delay means and, if necessary, the additional delay means are implemented, the distance resolution is increased by the factor D in comparison with signal delay devices known from the prior art. Only the demultiplexer and the multiplexer have to be designed for the external transmission rate.

In one design of the second alternative of the signal delay device according to the invention, it is provided that the control unit is designed to determine the separate forwarding delay factors according to $m_d = \lfloor (n+d-1)/D \rfloor$ with $d \in \mathbb{N} \leq D$.

In one design of one of the signal delay devices according to the invention, it is provided that the external transmission rate is S≥2 GS/s, preferably S≥2.5 GS/s. In a further design, D=2, preferably D=8, especially preferably D=4. If the external transmission rate is S≥2.5 GS/s and D=4, then the internal transmission rate is P=S/D=(2.5 GS/s)/4=625 MS/s. This internal transmission rate can be implemented by ICs that operate at a work cycle of 625 MHz. For example, FPGAs having such a work cycle are available.

In a further design, it is provided that the demultiplexer and/or the multiplexer has or have a work cycle $f_S$ corresponding to the external transmission rate S.

If the external transmission rate is S=2.5 GS/s, then the work cycle of the demultiplexer and/or multiplexer is $f_S$=2.5 GHz.

In a further design it is provided that at least one of the D delay means has the work cycle $f_P$=S/D. Preferably, the work cycle $f_P$ corresponds to the work cycle $f_A$ of the IC.

In a further design it is provided that at least one of the delay means is a delay line.

In a further design it is provided that the signal delay device is designed to simulate distances in distance measuring devices based on radar or lidar.

The above object is also achieved by a simulator device according to the present disclosure.

In this simulator device, the signal delay device of the simulator device is designed as described above.

In a first design of the simulator device according to the invention, it is provided that the simulator device has a single antenna for both transmission and reception.

In a further design of the simulator device it is provided that the simulator device is designed for the simulation of distances for distance measuring devices based on radar or lidar.

BRIEF DESCRIPTION OF THE DRAWINGS

In detail, there is a plurality of possibilities for designing and further developing the signal delay devices and the simulator device. Reference is made to the following description of a preferred embodiment of a simulator device with a signal delay device in conjunction with the drawings.

DETAILED DESCRIPTION

Figure 1:
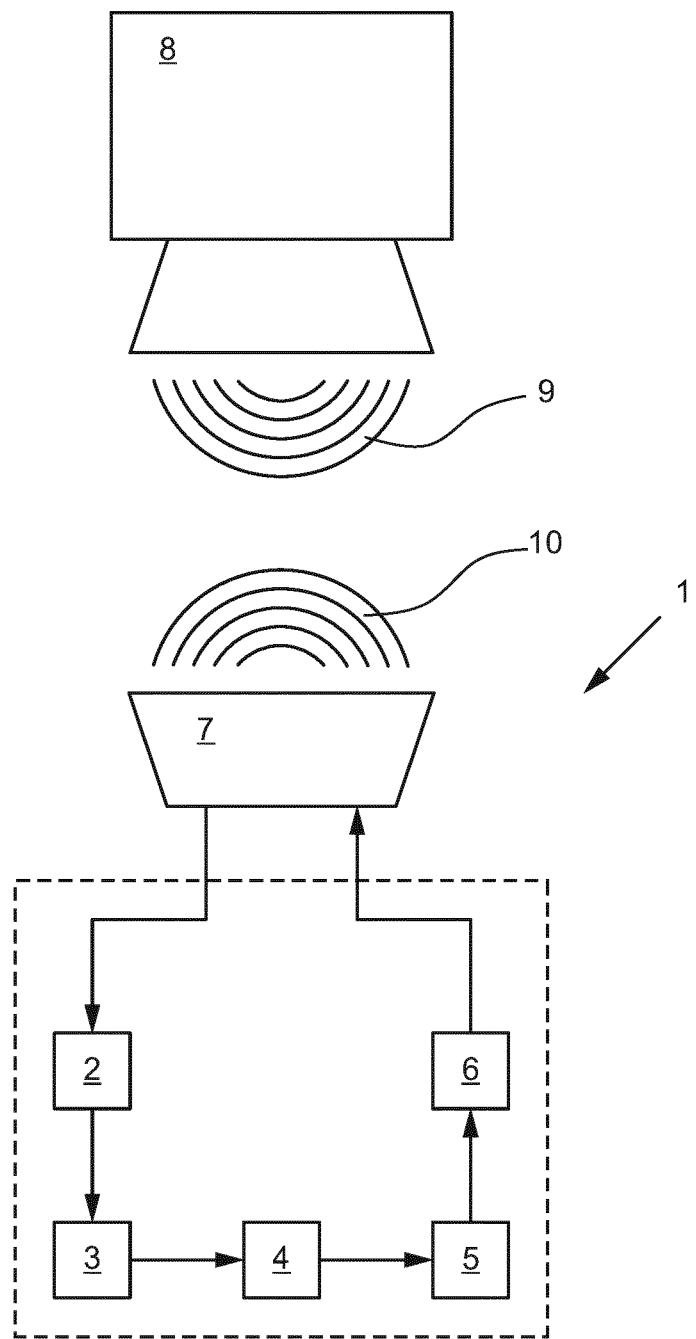
FIG. 1 schematically illustrates an embodiment of a simulator device.

FIG. 1 shows an embodiment of a simulator device 1 in a block diagram. The simulator device 1 has a receiver 2, an analog-to-digital converter 3, a signal delay device 4, a digital-to-analog converter 5, a transmitter 6 and an antenna 7. The simulator device 1 is part of simulator, not shown, for testing a distance measuring device 8.

The distance measuring device 8 is a radar distance measuring device which operates with signals in a frequency range around a frequency of 77 GHz. During operation, outside a simulator, the distance measuring device 8 determines a distance between the distance measuring device 8 and an object from an overall transit time of a signal. The overall transit time of the signal is determined, in particular, by the transit time of a measurement signal from the distance measuring device 8 to the object and the transit time of an echo signal reflected from the object back to the distance measuring device 8.

In the simulator device 1, the receiver 2 is designed to receive a measurement signal radiated by the distance measuring device 8 in the form of first electromagnetic waves 9 via the antenna 7, to mix it downwards and to feed it to the analog-to-digital converter 3. The analog-to-digital converter 3 is designed to convert the downwardly mixed measurement signal into a data word stream and to feed it to the signal delay device 4. The signal delay device 4 is designed to delay the data word stream by $\Delta t$ and to feed the delayed data word stream to the digital-to-analog converter 5. By designing the signal delay device 4 to delay the data word stream, it is designed to simulate spatial distances. The same, thus, applies to the simulator device 1. The digital-to-analog converter 5 is designed to convert the delayed data word stream into an echo signal and supply it to the transmitter 6. The transmitter 6 is designed to mix the echo signal upwards and radiate it back to the distance measuring device 8 in the form of second electromagnetic waves 10.

The simulator device 1 thus generates an echo signal from the received measurement signal with a delay $\Delta t$ and radiates it back to the distance measuring device 8. The echo signal is received by the distance measuring device 8 and when the measurement signal and echo signal are evaluated by the distance measuring device 8, the delay $\Delta t$ added by the signal delay device 4 increases the overall transit time. The delay $\Delta t$ generated by the signal delay device 4 appears as a transit time to the distance measuring device 8, which is why a distance $\Delta d$ between the distance measuring device 8 and a simulated object can be set by setting the delay $\Delta t$. Due to the integration of the distance information into the electromagnetic waves 10, the simulator is an OTA device.

Figure 2:
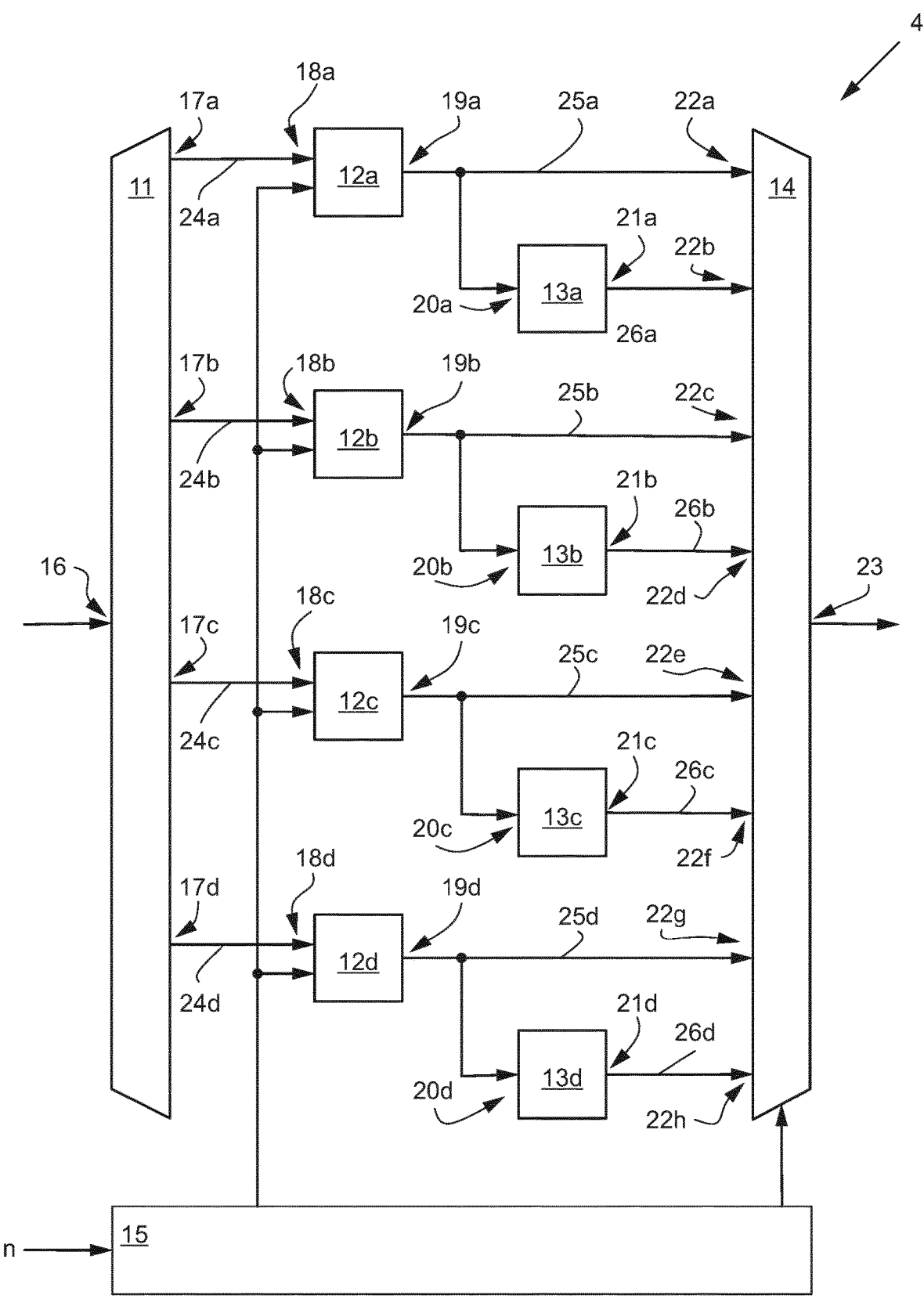
FIG. 2 schematically illustrates a first embodiment of a signal delay device.
Figure 5:
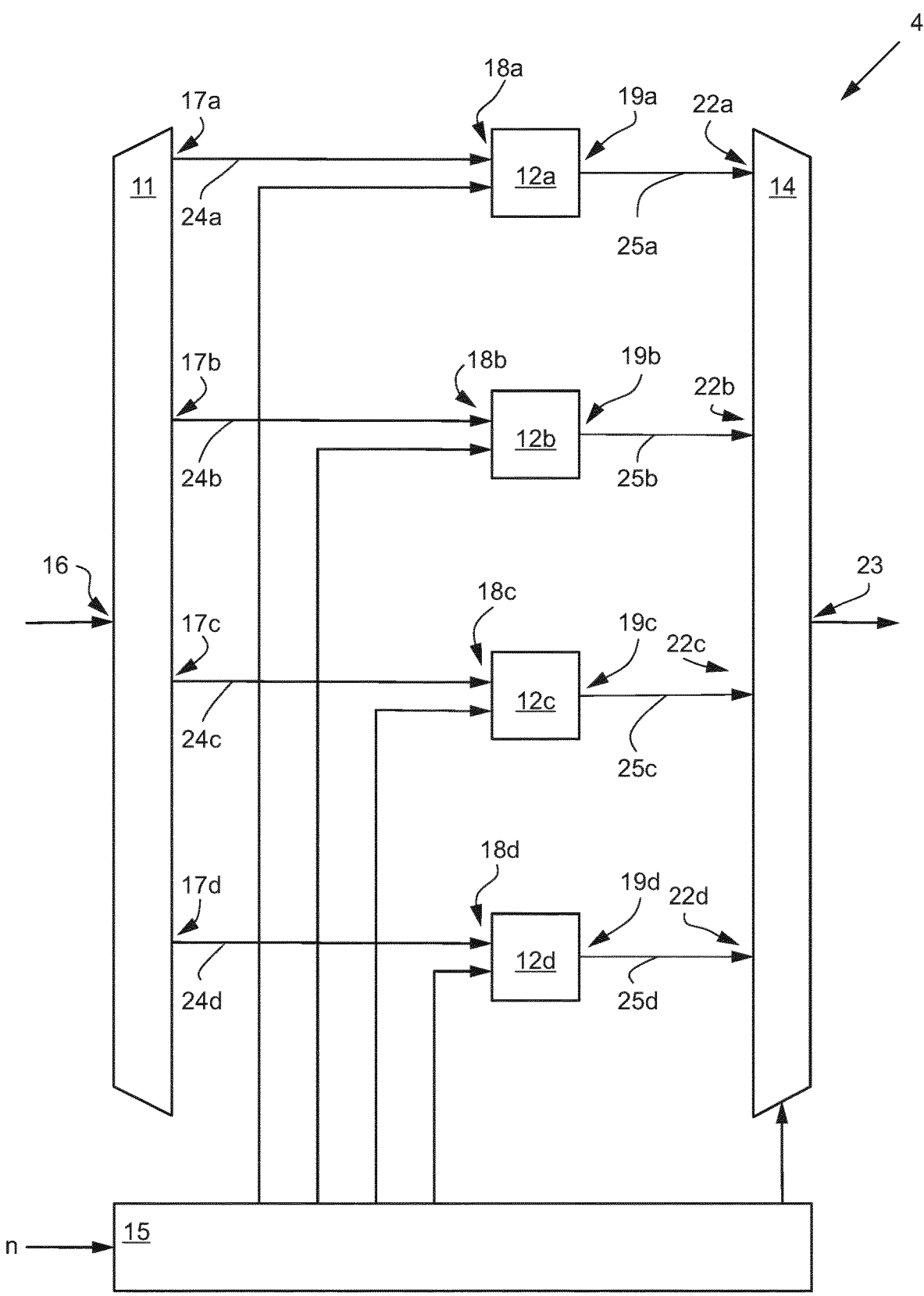
FIG. 5 schematically illustrates a second embodiment of a signal delay device.

The signal delay device 4 can be implemented in various ways. FIG. 2 shows a first embodiment of the signal delay device 4 and FIG. 5 shows a second embodiment.

The first embodiment of the signal delay device 4 shown in FIG. 2 shows a demultiplexer 11, four delay means 12a-12d, four additional delay means 13a13d, a multiplexer 14 and a control unit 15. Accordingly, in this embodiment D=4. The four delay means 12a-12d, the four additional delay means 13a13d and the control unit 15 are implemented in one FPGA.

The demultiplexer 11 has one demultiplexer input 16 and four demultiplexer outputs 17a-17d. Each of the four delay means 12a-12d has one delay input 18a-18d and one delay output 19a-19d. Each of the four additional delay means 13a-13d has one additional delay input 20a-20d and one additional delay output 21a-21d. The multiplexer 14 has eight multiplexer inputs 22a-22h and one multiplexer output 23. Thus, the number of multiplexer inputs 22a22h is twice as large as the number of demultiplexer outputs 17a-17d.

In each of the four delay means 12a-12d, the delay input 18a-18d and one of the four demultiplexer outputs 17a-17d are connected to one another via an input signal path 24a-24d, and the delay output 19a-19d and one of the eight multiplexer inputs 22a-22h are connected to one another via a delay signal path 25a-25d. In each of the four additional delay means 13a-13d, the additional delay input 20a-20d is connected to one of the delay signal paths 25a25d, and the additional delay output 21a-21d and one of the eight multiplexer inputs 22a-22h are connected to one another via an additional delay signal path 26a-26d. The individual input signal paths 24a-24d are separate from one another, i.e. not connected to one another. The same applies to the individual delay signal paths 25a-25d and also to the additional delay signal paths 26a26d.

The demultiplexer 11 is designed to separate an input data word stream containing data words ($a_0$, $a_1$, $a_2$, $a_3$, $a_4$, $a_5$, $a_6$, $a_7$, $a_8$, $a_9$, $a_{10}$, $a_{11}$, . . . ) with an external transmission rate of S=2.5 GS/s at the demultiplexer input 16 into four parallel, interleaved data word streams ($a_0$, $a_4$, $a_8$, . . . ) and ($a_1$, $a_5$, $a_9$, . . . ) and ($a_2$, $a_6$, $a_{10}$, . . . ) and ($a_3$, $a_7$, $a_{11}$, . . . ) with an internal transmission rate, in each case, of P=S/D=(2.5 GS/s)/4=625 MS/s and to output these at the four demultiplexer outputs 17a-17d. In the data word streams, each data word has 10 bits.

Each of the four delay means 12a-12d can be preset with a forwarding delay factor $m \in \mathbb{N}_0$ and each of the four delay means 12a-12d is designed to delay each data word in the respective parallel data word stream at the delay input 18a-18d by a forwarding delay time $\Delta t_m = m/P = m/(625$ MS/s$) = m \cdot 1.6$ ns and to output the delayed data word at the delay output 19a-19d. The forwarding delay time is identical for all four delay means 12a-12d.

Each of the four additional delay means 13a-13d is designed to delay each data word in the respective delayed parallel data word stream at the additional delay input 20a-20d by an additional delay time of $\Delta t_z = 1/P = 1/(625$ MS/s$) = 1.6$ ns and to output the additional delayed data word at the additional delay output 21a-21d.

An output delay factor $n \in \mathbb{N}_0$ can be preset for the control unit 15. It is designed to determine the forwarding delay factor m from a preset output delay factor n and to preset it for the four delay means 12a-12d. Furthermore, it is designed to control the multiplexer 14 in such a way that an output data word stream corresponding to the input data word stream with a time delay of $\Delta t = n/S = n/(2.5$ GS/s$) = n \cdot 0.4$ ns is output at the multiplexer output 23. For this, the control unit 15 is designed to determine the forwarding delay factor according to $m = \lfloor n/4 \rfloor$. Thus, form as a function of n:

| n | 0 | 1 | 2 | 3 | 4 | 5 | 6 | 7 | 8 |
|---|---|---|---|---|---|---|---|---|---|
| m | 0 | 0 | 0 | 0 | 1 | 1 | 1 | 1 | 2 |

FIGS. 3a-3j and 4a-4j show data word streams at certain locations in the signal delay device 4 according to the first embodiment and illustrate the setting of the multiplexer 14 by the control unit 15 so that a data word stream delayed by $\Delta t$ compared to the data word stream at the demultiplexer input 16 is preset at the multiplexer output 23.

FIG. 3a-3j show the data word streams over time for n=4. Accordingly, m=1, $\Delta t_m = m/P = 1/(625$ MS/s$) = 1.6$ ns and $\Delta t = n/S = 4 \cdot 0.4$ ns$=1.6$ ns. The time axes of FIG. 3a-3j are synchronous to each other.

Figure 3:
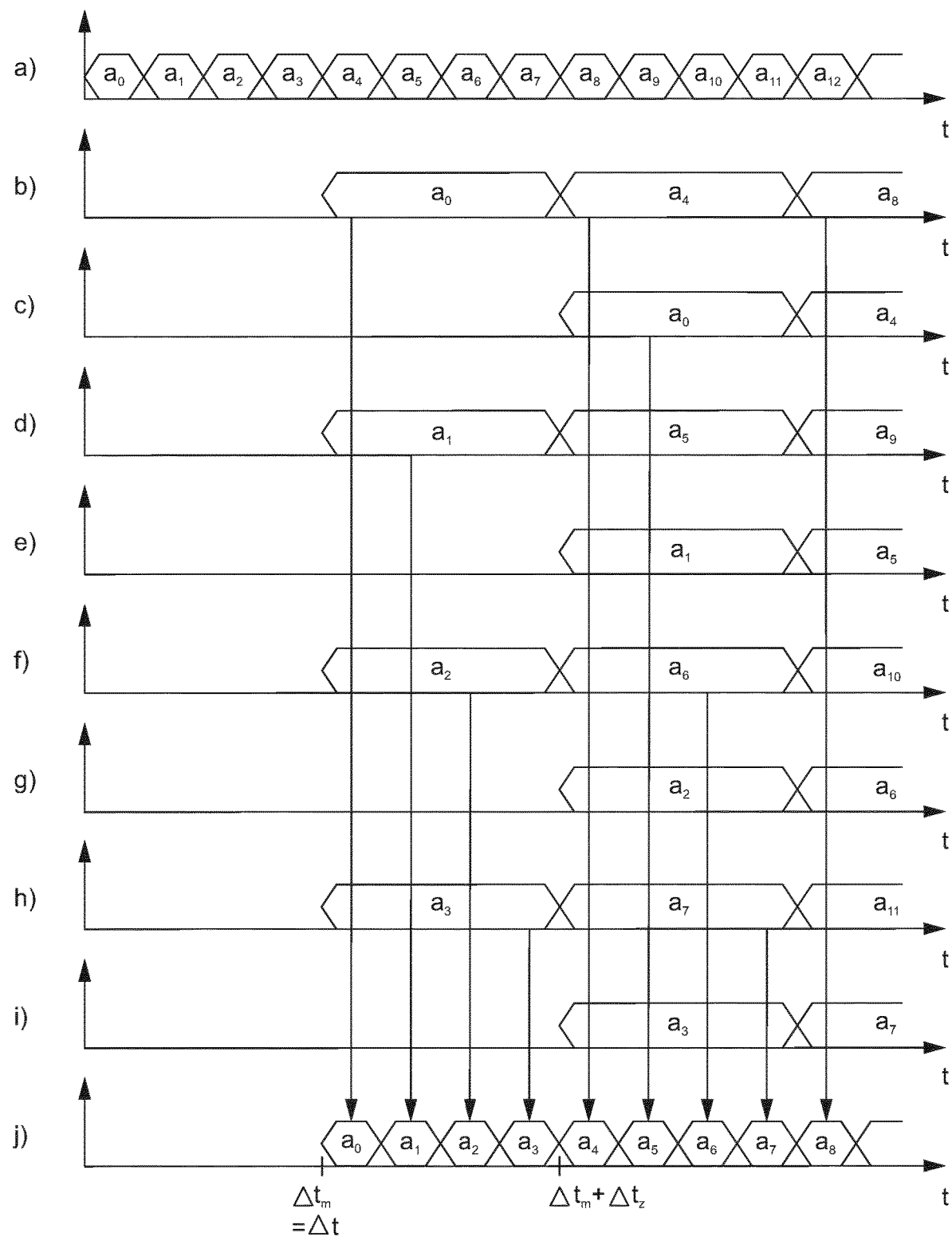
FIG. 3a-3j schematically illustrate data word streams in the first embodiment for n=4.

FIG. 3a shows the data word stream at the demultiplexer input 16, FIG. 3b at the multiplexer input 22a, FIG. 3c at the multiplexer input 22b, FIG. 3d at the multiplexer input 22c, FIG. 3e at the multiplexer input 22d, FIG. 3f at the multiplexer input 22e, FIG. 3g at the multiplexer input 22f, FIG. 3h at the multiplexer input 22g, FIG. 3i at the multiplexer input 22h and FIG. 3j at the multiplexer output 23.

While the data word streams at the demultiplexer input 16 and at the multiplexer output 23 have the external transmission rate S=2.5 GS/s, the data word streams between the demultiplexer outputs 17a-17d and the multiplexer inputs 22a-22h have the internal transmission rate P=625 MS/s.

The vertical arrows running from the data word streams in FIG. 3b-3i to the data word stream in FIG. 3j symbolize the setting of the multiplexer 14 by control unit 15.

Figure 4:
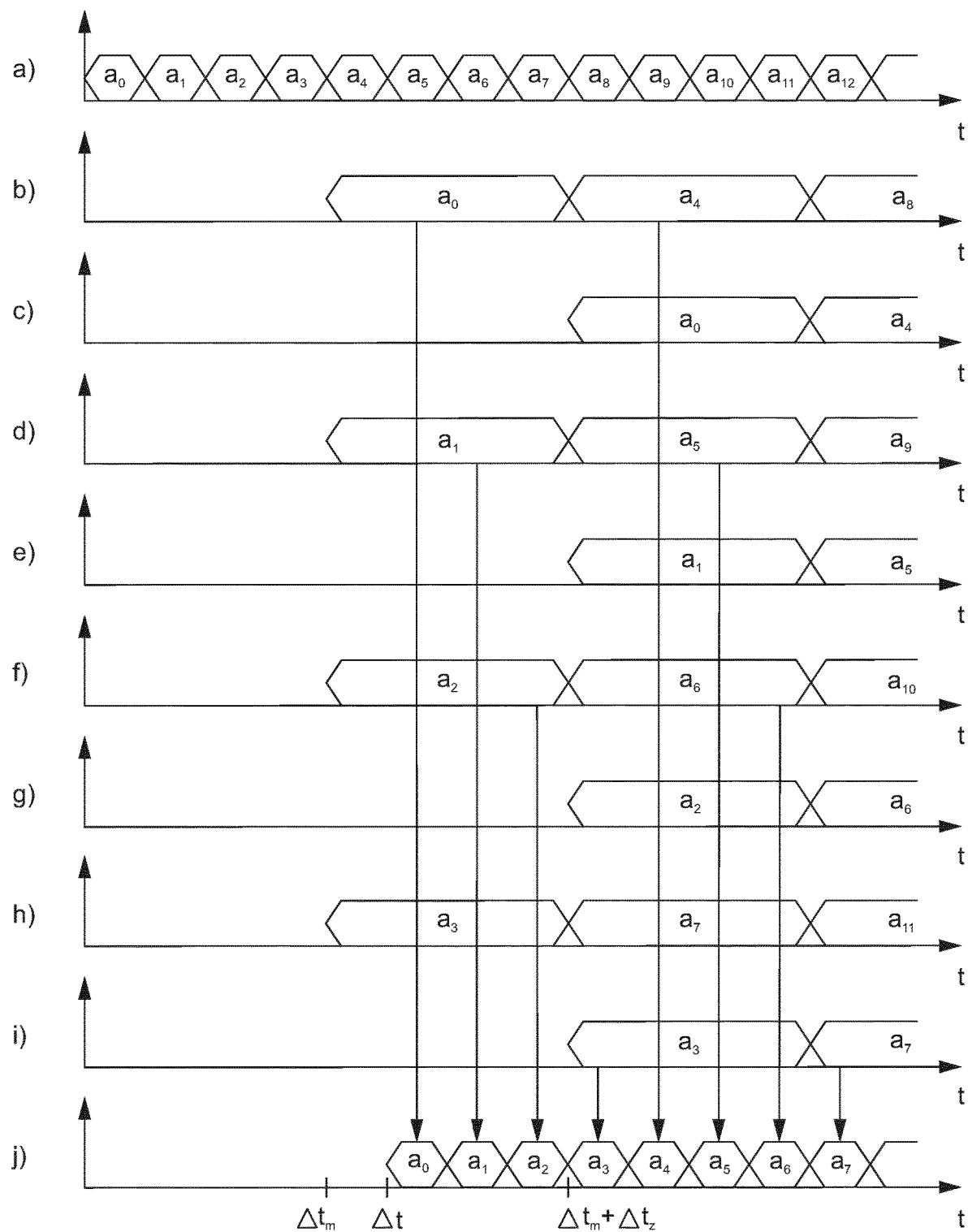
FIG. 4a-4j schematically illustrate data word streams in the first embodiment for n=5.

FIG. 4a-4j show the data word streams for n=5. Accordingly, $\Delta t = n/S = 5 \cdot 0.4$ ns=2.0 ns and is still m=1. The data word streams in FIG. 4a-4i are identical to those in FIG. 3a-3i. Only the data word stream shown in FIG. 4j is delayed by a further 0.4 ns compared to the data word stream shown in 3j. This also shows the necessity of the additional delay means 13a-13d. The data words $a_3$ and $a_7$ are provided by these at the correct time, since the delay means 12a12d already provide the next data words $a_7$ and $a_{11}$.

The second embodiment of the signal delay device 4 shown in FIG. 5 comprises a demultiplexer 11, four delay means 12a-12d, a multiplexer 14 and a control unit 15. Accordingly, D=4 in this embodiment. The four delay means 12a-12d and the control unit 15 are implemented in one FPGA.

The demultiplexer 11 has one demultiplexer input 16 and four demultiplexer outputs 17a-17d. Each of the four delay means 12a-12d has one delay input 18a-18d and one delay output 19a-19d. The multiplexer 14 has four multiplexer inputs 22a-22d and one multiplexer output 23. Therefore, the number of multiplexer inputs 22a-22d is as large as the number of demultiplexer outputs 17a-17d.

For each of the four delay means 12a-12d, the delay input 18a-18d and one of the four demultiplexer outputs 17a-17d are connected to one another via an input signal path 24a-24d and the delay output 19a-19d and one of the four multiplexer inputs 22a-22d are connected to one another via a delay signal path 25a-25d. The individual input signal paths 24a-24d are separate from one another, i.e. not connected to one another. The same applies to the individual delay signal paths 25a-25d.

The demultiplexer 11 is designed to divide an input data word stream containing data words ($a_0$, $a_1$, $a_2$, $a_3$, $a_4$, $a_5$, $a_6$, $a_7$, $a_8$, $a_9$, $a_{10}$, $a_{11}$, . . . ) with an external transmission rate of S=2.5 GS/s at the demultiplexer input 16 into four parallel, interleaved data word streams ($a_0$, $a_4$, $a_8$, . . . ) and ($a_1$, $a_5$, $a_9$, . . . ) and ($a_2$, $a_6$, $a_{10}$, . . . ) and ($a_3$, $a_7$, $a_{11}$, . . . ) with an internal transmission rate, in each case, of P=S/D=(2.5 GS/s)/4=625 MS/s and to output these at the four demultiplexer outputs 17a-17d. In the data word streams, each data word has 10 bits.

Each of the four delay means 12a-12d can be preset with a separate forwarding delay factor $m_d \in \mathbb{N}_0$ with $d \in \mathbb{N} \leq 4$ and each of the four delay means 12a-12d is designed to delay each data word in the respective parallel data word stream at the delay input 18a-18d by a forwarding delay time $\Delta t_{m,d} = m_d/P = m_d/(625 \text{ MS/s})$ and to output the delayed data word at the delay output 19a-19d. The forwarding delay time can thus be different between the four delay means 12a12d.

An output delay factor $n \in \mathbb{N}_0$ can be preset for the control unit 15. This is designed to determine the separate forwarding delay factors $m_d$ from a preset output delay factor n and to preset them to the four settable delay means 12a12d. In addition, it is designed to control the multiplexer 14 in such a way that an output data word stream corresponding to the input data word stream with a time delay of $\Delta t = n/S = n/(2.5 \text{ GS/s}) = n \cdot 0.4$ ns is output at the multiplexer output 23. For this, the control unit is designed to determine the forwarding delay factors according to $m_d = [(n+d-1)/4]$ mit $d \in \mathbb{N} \leq 4$. Thus, for $m_d$ as a function of n:

| n | $m_1$ | $m_2$ | $m_3$ | $m_4$ |
|---|---|---|---|---|
| 0 | 0 | 0 | 0 | 0 |
| 1 | 0 | 0 | 0 | 1 |
| 2 | 0 | 0 | 1 | 1 |
| 3 | 0 | 1 | 1 | 1 |
| 4 | 1 | 1 | 1 | 1 |
| 5 | 1 | 1 | 1 | 2 |
| 6 | 1 | 1 | 2 | 2 |
| 7 | 1 | 2 | 2 | 2 |
| 8 | 2 | 2 | 2 | 2 |

FIGS. 6a-6f and 7a-7f show data word streams at certain locations in the signal delay device 4 according to the second embodiment and illustrate the setting of the multiplexer 14 by the control unit 15 so that a data word stream delayed by $\Delta t$ compared to the data word stream at the demultiplexer input 16 is preset at the multiplexer output 23.

FIG. 6a-6f show the data word streams over time for n=4. Accordingly, $m_1 = m_2 = m_3 = m_4 = 1$, $\Delta t_{m,1} = \Delta t_{m,2} = \Delta t_{m,3} = \Delta t_{m,4} = 1.6$ ns and $\Delta t = n/S = 4 \cdot 0.4$ ns=1.6 ns. The time axes of FIG. 6a-6f are synchronous to one another.

Figure 6:
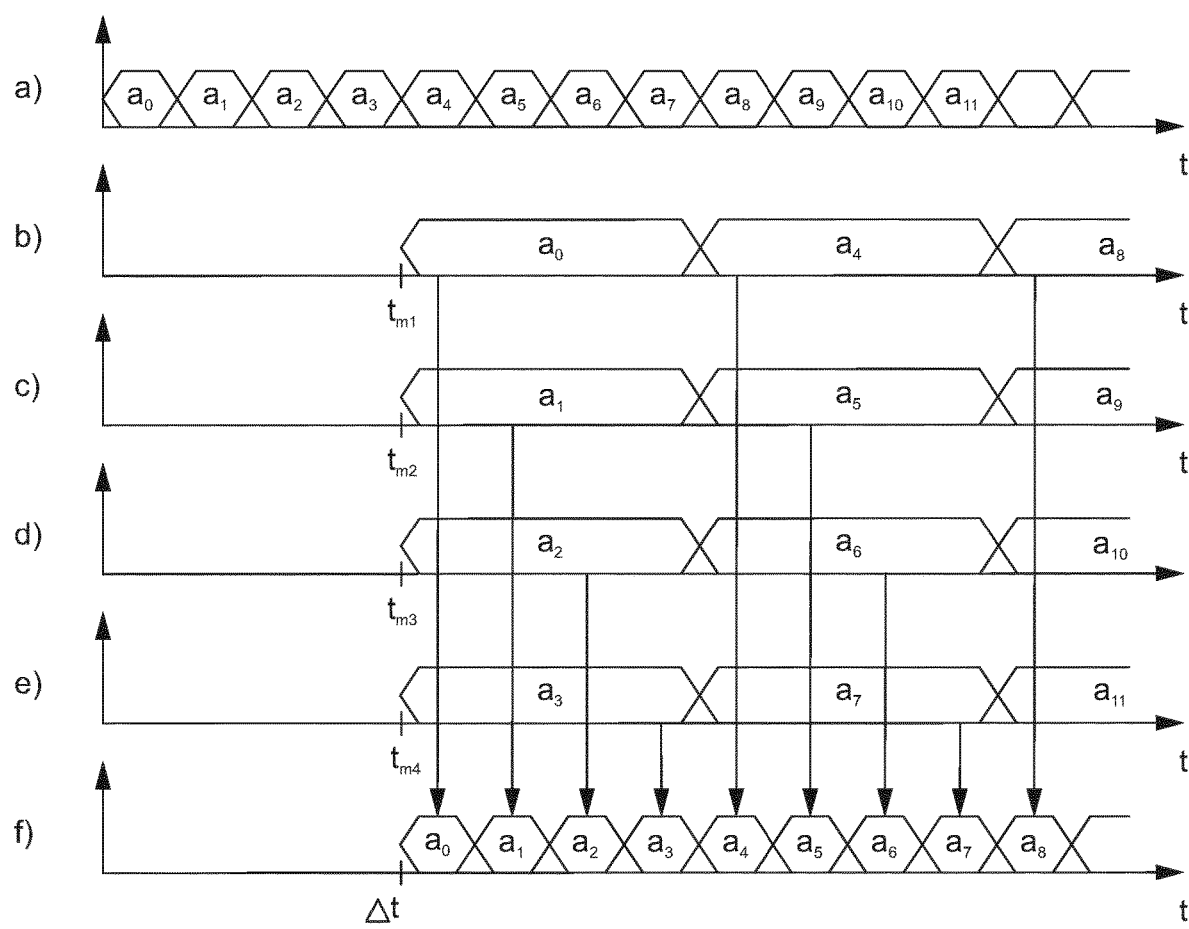
FIG. 6a-6f schematically illustrate data word streams in the second embodiment for n=4.

FIG. 6a shows the data word stream at the demultiplexer input 16, FIG. 6b at the multiplexer input 22a, FIG. 6c at the multiplexer input 22b, FIG. 6d at the multiplexer input 22c, FIG. 6e at the multiplexer input 22d and FIG. 6f at the multiplexer output 23.

While the data word streams at the demultiplexer input 16 and at the multiplexer output 23 have the external transmission rate S=2.5 GS/s, the data word streams between the demultiplexer outputs 17a-17d and the multiplexer inputs 22a-22h have the internal transmission rate P=625 MS/s.

The vertical arrows running from the data word streams in FIG. 6b-6e to the data word stream in FIG. 6f symbolize the setting of the multiplexer 14 by the control unit 15.

Figure 7:
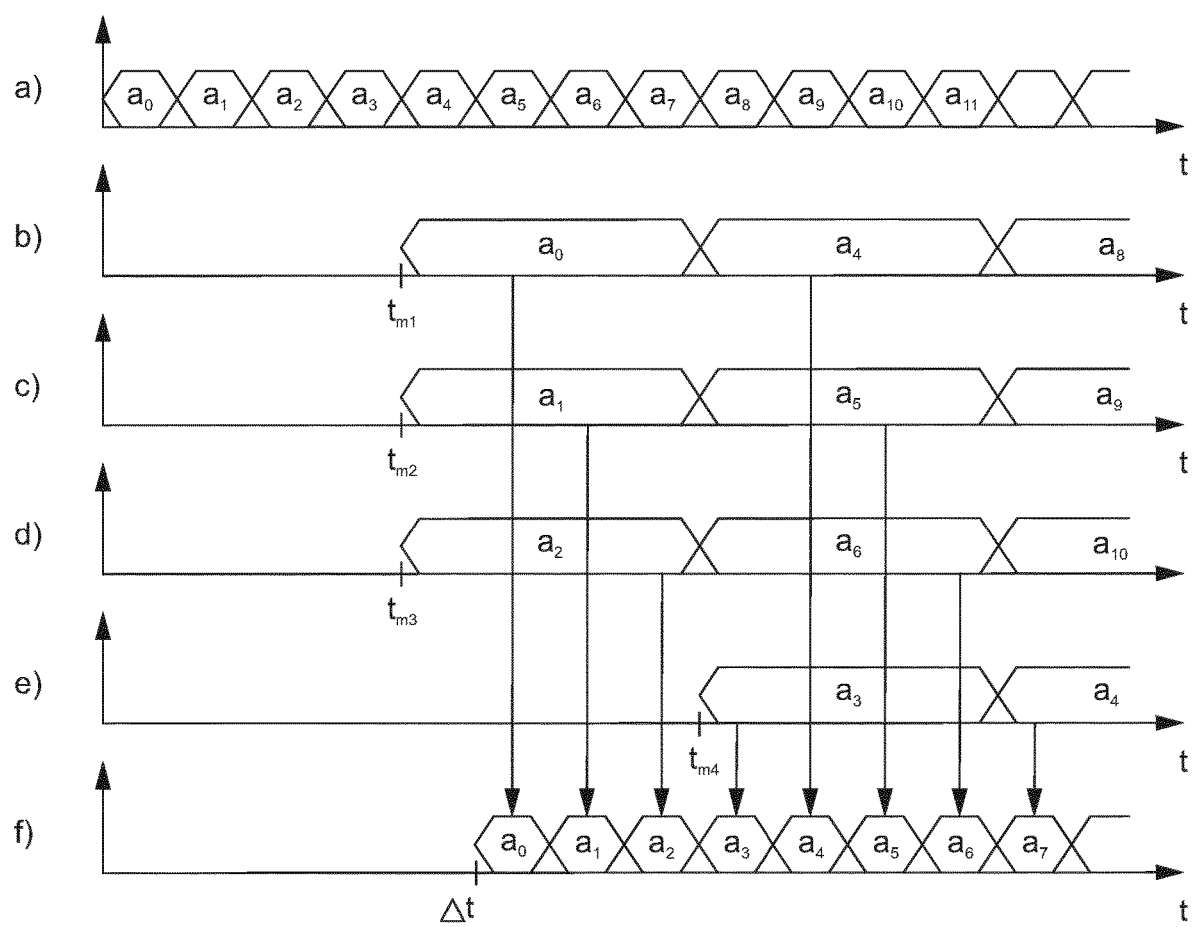
FIG. 7a-7f schematically illustrate data word streams in the second embodiment for n=5.

FIG. 7a-7f show the data word streams for n=5. Thus, $m_1 = m_2 = m_3 = 1$, $m_4 = 2$, $\Delta t_{m,1} = \Delta t_{m,2} = \Delta t_{m,3} = 1.6$ ns, $\Delta t_{m,4} = 3.2$ ns and $\Delta t = n/S = 5 \cdot 0.4$ ns=2.0 ns. The data word streams in FIG. 7a-7d are identical to those in FIG. 6a-6d. The data word stream shown in FIG. 6e is delayed by a further 1.6 ns so that data words $a_3$ and $a_7$ are available at the correct time. The data word stream shown in FIG. 7f is delayed by a further 0.4 ns compared to the data word stream shown in FIG. 6f.

The invention claimed is:

1. A signal delay device for simulating spatial distances in distance measuring devices using electromagnetic waves, comprising:
   a demultiplexer;
   $D \in \mathbb{N}$ delay means;
   D additional delay means;
   a multiplexer; and
   a control unit;
   wherein the demultiplexer has a demultiplexer input and D demultiplexer outputs;
   wherein each of the D delay means has a delay input and a delay output;
   wherein each of the D additional delay means has an additional delay input and an additional delay output;

wherein the multiplexer has 2·D multiplexer inputs and a multiplexer output;

wherein for each of the D delay means: (i) the delay input and one of the D demultiplexer outputs are connected to one another via an input signal path; and (ii) the delay output and one of the 2·D multiplexer inputs are connected to one another via a delay signal path;

wherein, for each of the D additional delay means: (i) the additional delay input is connected to one of the delay signal paths; and (ii) the additional delay output and one of the 2·D multiplexer inputs are connected to one another via an additional delay signal path;

wherein the demultiplexer is designed to divide an input data word stream having data words with an external transmission rate of S at the demultiplexer input into interleaved, parallel data word streams at an internal transmission rate of P=S/D in each case and to output these parallel data word streams at the D demultiplexer outputs;

wherein each of the D delay means can be preset with a forwarding delay factor m∈$\mathbb{N}_0$, and each of the D delay means is designed to delay each data word in the respective parallel data word stream at the delay input by a forwarding delay time $\Delta t_m$=m/P and to output the delayed data word at the delay output;

wherein each of the D additional delay means is designed to delay each data word in the respective delayed parallel data word stream at the additional delay input by an additional delay time of $\Delta t_z$=1/P and to output the additionally delayed data word at the additional delay output;

wherein an output delay factor n∈$\mathbb{N}_0$ can be preset to the control unit, the control unit is designed to determine the forwarding delay factor m from a predefined output delay factor n and to preset this to the D delay means and to control the multiplexer in such a manner that an output data word stream corresponding to the input data word stream with a time delay of $\Delta t$=n/S is output at the multiplexer output; and wherein D is an integer greater than or equal to one, $\mathbb{N}$ is a first set of integers greater than zero, and $\mathbb{N}_0$ is a second set of integers greater than or equal to zero.

2. The signal delay device according to claim 1, wherein at least one of the delay means and/or one of the additional delay means is/are implemented in a field-programmable gate array.

3. The signal delay device according to claim 1, wherein the control unit is adapted to determine the forwarding delay factor according to m=⌊n/D⌋.

4. The signal delay device according to claim 1, wherein at least one of the D additional delay means has a work cycle of $f_p$=S/D.

5. The signal delay device according to claim 1, wherein at least one of the additional delay means is a delay line.

6. The signal delay device according to claim 1, wherein at least one of the additional delay means is a flip-flop.

7. The signal delay device for simulating spatial distances in distance measuring devices using electromagnetic waves, comprising:
a demultiplexer;
D∈$\mathbb{N}$ delay means;
a multiplexer; and
a control unit;
wherein the demultiplexer has a demultiplexer input and D demultiplexer outputs;

wherein each of the D delay means has a delay input and a delay output;

wherein the multiplexer has D multiplexer inputs and a multiplexer output;

wherein for each of the D delay means: (i) the delay input and one of the D demultiplexer outputs are connected to one another via an input signal path; and (ii) the delay output and one of the D multiplexer inputs are connected to one another via a delay signal path;

wherein the demultiplexer is designed to divide an input data word stream having data words with an external transmission rate of S at the demultiplexer input into interleaved, parallel data word streams at an internal transmission rate of P=S/D in each case and to output these parallel data word streams at the D demultiplexer outputs;

wherein each of the D delay means can be preset with a separate forwarding delay factor $m_d$∈$\mathbb{N}_0$ with d∈$\mathbb{N}$ ≥D, and each of the D delay means is designed to delay each data word in the respective parallel data word stream at the delay input by a separate forwarding delay time $\Delta t_{m,d}$=$m_d$/P and to output the delayed data word at the delay output;

wherein an output delay factor n∈$\mathbb{N}_0$ can be preset to the control unit, the control unit is designed to determine the forwarding delay factors ma from a predefined output delay factor n and to preset them to the D presettable delay means and to control the multiplexer in such a manner that an output data word stream corresponding to the input data word stream with a time delay of $\Delta t$=n/S is output at the multiplexer output; and wherein D is an integer greater than or equal to one, $\mathbb{N}$ is a first set of integers greater than zero, and $\mathbb{N}_0$ is a second set of integers greater than or equal to zero.

8. The signal delay device according to claim 7, wherein at least one of the delay means is implemented in a field-programmable gate array.

9. The signal delay device according to claim 7, wherein the control unit is adapted to determine the separate forwarding delay factors according to $m_d$=⌊(n+d−1)/D⌋ for d∈$\mathbb{N}$ ≤D.

10. The signal delay device according to claim 1, wherein the external transmission rate is greater than or equal to 2 billion data words per second.

11. The signal delay device according to claim 1, wherein D=2.

12. The signal delay device according to claim 1, wherein the demultiplexer and/or the multiplexer has/have a work cycle fs corresponding to the external transmission rate S.

13. The signal delay device according to claim 1, wherein at least one of the D delay means has a work cycle of $f_p$=S/D.

14. The signal delay device according to claim 1, wherein at least one of the delay means is a delay line.

15. The signal delay device according to claim 1, wherein the signal delay device is designed to simulate distances in distance measuring devices using radar or lidar.

16. A simulator device for simulating spatial distances for distance measuring devices using electromagnetic waves, comprising:
a receiver;
an analog-to-digital converter;
a signal delay device;
a digital-to-analog converter; and
a transmitter;

wherein the receiver is designed to receive measurement signals radiated by a distance measuring device in the form of first electromagnetic waves, to mix them downward and to feed them to the analog-to-digital converter;

wherein the analog-to-digital converter is designed to convert the downwardly mixed measurement signals into a data word stream and to feed them to the signal delay device;

wherein the signal delay device is designed to delay the data word stream and to feed the delayed data word stream to the digital-to-analog converter;

wherein the digital-to-analog converter is designed to convert the delayed data word stream into echo signals and to feed them to the transmitter; and wherein the transmitter is designed to mix the echo signals upwards and radiate them in the form of second electromagnetic waves to the distance measuring device;

wherein the signal delay device includes:

a demultiplexer;

$D \in \mathbb{N}$ delay means;

D additional delay means;

a multiplexer; and a control unit;

wherein the demultiplexer has a demultiplexer input and D demultiplexer outputs;

wherein each of the D delay means has a delay input and a delay output;

wherein each of the D additional delay means has an additional delay input and an additional delay output;

wherein the multiplexer has 2·D multiplexer inputs and a multiplexer output;

wherein for each of the D delay means: (i) the delay input and one of the D demultiplexer outputs are connected to one another via an input signal path; and (ii) the delay output and one of the 2·D multiplexer inputs are connected to one another via a delay signal path;

wherein, for each of the D additional delay means: (i) the additional delay input is connected to one of the delay signal paths; and (ii) the additional delay output and one of the 2·D multiplexer inputs are connected to one another via an additional delay signal path;

wherein the demultiplexer is designed to divide an input data word stream having data words with an external transmission rate of S at the demultiplexer input into interleaved, parallel data word streams at an internal transmission rate of P=S/D in each case and to output these parallel data word streams at the D demultiplexer outputs;

wherein each of the D delay means can be preset with a forwarding delay factor $m \in \mathbb{N}\,0$, and each of the D delay means is designed to delay each data word in the respective parallel data word stream at the delay input by a forwarding delay time $\Delta t_m = m/P$ and to output the delayed data word at the delay output;

wherein each of the D additional delay means is designed to delay each data word in the respective delayed parallel data word stream at the additional delay input by an additional delay time of $\Delta t_z = 1/P$ and to output the additionally delayed data word at the additional delay output;

wherein an output delay factor $n \in \mathbb{N}\,0$ can be preset to the control unit, the control unit is designed to determine the forwarding delay factor m from a predefined output delay factor n and to preset this to the D delay means and to control the multiplexer in such a manner that an output data word stream corresponding to the input data word stream with a time delay of $\Delta t = n/S$ is output at the multiplexer output; and wherein D is an integer greater than or equal to one, N is a first set of integers greater than zero, and $\mathbb{N}_0$ is a second set of integers greater than or equal to zero.

17. The simulator device according to claim 16, wherein the simulator device includes a single antenna for both transmission and reception.

18. The simulator device according to claim 16, wherein the simulator device is designed to simulate distances for distance measuring devices using radar or lidar.

* * * * *